United States Patent [19]

Song

[11] Patent Number: 5,400,171
[45] Date of Patent: Mar. 21, 1995

[54] ACOUSTO-OPTIC FILTER WITH NEAR-IDEAL BANDPASS CHARACTERISTICS

[75] Inventor: Ghie H. Song, Tinton Falls, N.J.

[73] Assignee: Bell Communications Research, Inc., Livingston, N.J.

[21] Appl. No.: 131,522

[22] Filed: Oct. 1, 1993

[51] Int. Cl.$^6$ .................................... G02F 1/11
[52] U.S. Cl. ................................ 359/285; 359/308; 385/7
[58] Field of Search ................. 359/285–287, 359/305, 308; 385/1–4, 7–9, 11, 27, 28, 29

[56] References Cited

U.S. PATENT DOCUMENTS

| | | | |
|---|---|---|---|
| 3,158,819 | 11/1964 | Tien | 330/5.5 |
| 4,273,411 | 6/1981 | Alferness | 385/28 X |
| 4,390,236 | 6/1983 | Alferness | 385/9 |
| 4,781,425 | 11/1988 | Risk et al. | 385/1 |
| 5,002,349 | 3/1991 | Cheung et al. | 385/1 |
| 5,218,653 | 6/1993 | Johnson et al. | 385/11 |

OTHER PUBLICATIONS

G. S. Kino, *Acoustoelectric interactions in acoustic-surface-wave devices*, Proceedings of the IEEE, vol. 64, pp. 724-748, 1976 (May).

L. A. Coldren and G. S. Kino, *CW monolithic acoustic surface wave amplifier incorporated in a Δv/v waveguide*, Applied Physics Letters, vol. 23, pp. 117-118, 1973 (Aug.).

D. A. Smith et al., *Surface-acoustic-wave directional coupler for apodization of integrated acoustooptic filters*, IEEE Trans. on Ultrasonics, Ferroelectrics, and Frequency Control, vol. 40, pp. 22-25, 1993 (Jan.).

G. H. Song et al., *Inverse-scattering problem for the coupled-wave equations when the reflection, coefficient is a rational function*, Proc. IEEE, 71, pp. 266-268, 1983 (Feb.).

G. H. Song et al., *Design of corrugated waveguide filters by the Gel'fand-Levitan-Marchenko Inverse-scattering Method*, J. Opt. Soc. Am., A, 2, pp. 1905-1915, 1985 (Nov.).

K. M. Lakin et al., *Surface Wave Delay Line Amplifiers*, Invited paper, IEEE Transactions on Microwave Theory and Techniques, vol. MITT-17, No. 11, Nov. 1969, pp. 912-920.

*Primary Examiner*—John D. Lee
*Attorney, Agent, or Firm*—Leonard Charles Suchyta; Loria B. Yeadon

[57] ABSTRACT

An acousto-optic tunable filter (100) is provided with an acousto-optic interaction profile that results in a frequency response with near-ideal bandpass filter characteristics of near-unity transmission inside the passband and near-zero transmission outside the passband. The acousto-optic interaction profile which results in this frequency response has a phase polarity which alternates and is damped, i.e. the acousto-optic interaction profile has a damped oscillating shape. The physical structure to implement this filter comprises a pair of acoustical waveguides (110, 112) which taper toward each other at the beginning of the profile and then are spaced apart by a constant distance. A damping layer (132) or other damping structure is provided to achieve the damping characteristics of the profile.

22 Claims, 7 Drawing Sheets

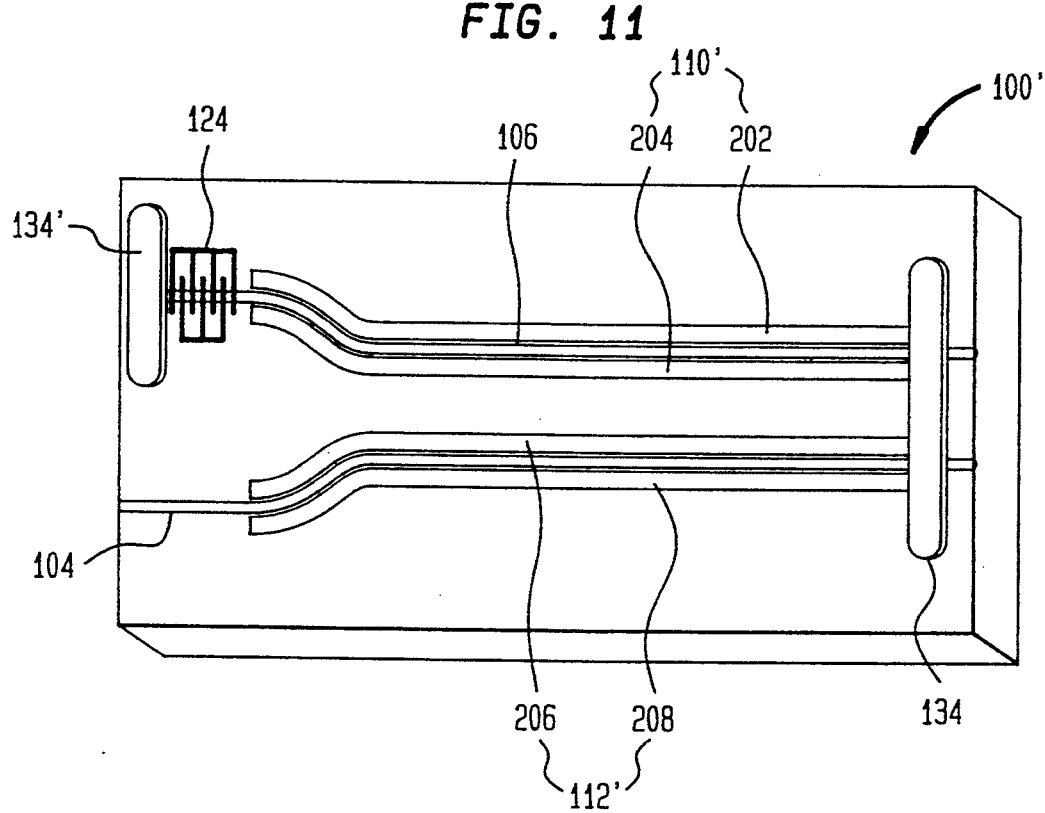

ACOUSTO-OPTIC FILTER WITH NEAR-IDEAL BANDPASS CHARACTERISTICS

FIELD OF THE INVENTION

The present invention relates to an acousto-optic filter which is used as a switch in a Wavelength Division Multiplexed (WDM) optical communications system. Prior-art acousto-optic filters have a frequency response with a very narrowly peaked passband resulting in severe wavelength alignment requirements in multiwavelength routing applications.. The present invention provides an acousto-optic filter whose passband is nearly rectangular in shape so as to mitigate the wavelength alignment problems found in prior-art acousto-optic filters.

BACKGROUND OF THE INVENTION

An acousto-optic filter which employs the Bragg scattering mechanism generally operates as follows. A single-mode optical waveguide is formed in a substrate comprising an optical material such as $LiNbO_3$. A surface acoustic wave (SAW) is generated on the substrate by a surface-acoustic-wave transducer. Multiwavelength light having a particular polarization state (TE or TM) enters the optical waveguide at one end. This light interacts with the surface acoustic wave generated by the surface-acoustic-wave transducer. The interaction of the multiwavelength light with the surface acoustic wave can result in a change in the polarization state of a particular one of the wavelengths in the multiwavelength light. Specifically, the propagation constant of a particular wavelength in the multiwavelength light combines (by addition or substraction) with the propagation constant of the surface acoustic wave to form the propagation constant of light with the particular wavelength, but with the orthogonal polarization state. When the propagation constants of the incoming light at a particular wavelength and the surface acoustic wave combine in this manner, efficient conversion of the polarization state of the incoming light with the particular wavelength takes place. Thus, in the filter input light, all of the wavelengths supposedly have the same polarization. In the filter output light, the polarization state of the particular wavelength has been changed, but the polarization state of all the other wavelengths remains unchanged. The optical wavelength whose polarization state is changed can be selected by selecting the propagation constant of the surface acoustic wave. The selected optical wavelength whose polarization state has been changed can be directed to one port, while the unselected wavelengths can be directed to a second band-reject port. Thus, an acoustic-optic filter of this type can be used to achieve a wavelength selective switch in a WDM optical communications system.

One problem with acousto-optic filters of the type described above is that the frequency response may have certain undesirable characteristics. In particular, prior-art acousto-optic filters have a frequency response with a passband which is highly peaked and which has significant side-lobes. The highly peaked passband means that there is little tolerance to an off-tuned input optical wavelength. The side lobes mean that there may not be sufficient separation between the selected wavelength and the unselected wavelengths for telecommunications system applications. Both of these problems cause crosstalk between channels.

The transmission bandpass characteristics of an acousto-optic filter of the type described above are determined by the acousto-optic interaction profile. The acousto-optic interaction profile is the amplitude profile of the surface undulation from the propagating acoustic wave along the path of interaction with the optical wave, i.e., along the optical waveguide. In other words, the acousto-optic interaction profile may be viewed as a modulation or envelope function which otherwise multiplies onto a monotonically sinusoidal acoustic wave on the surface. The acousto-optic interaction profile can be determined from a certain class of filter spectral response functions by using the so called inverse-scattering transform which resembles the well-known Fourier transform (see e.g. G. H. Song, et al "Inverse-scattering Problem For The coupled-wave Equations When The Refection Coefficient Is A Rational Function" Proc IEEE, 71, pp. 266-268, 1983; G. H. Song, et al "Design Of Corrugated Waveguide filters By The Gel'fand-Levitan-Marchenko Inverse-scattering Method", J. Opt. Soc. Am., A, 2, pp. 1905-1915, 1985). The filter frequency response can be determined from the acousto-optic interaction profile by solving the well-known coupled-mode equations.

FIG. 1 is a top view of a simple conventional acousto-optic tunable filter found in the prior art. The acousto-optic tunable filter 10 of FIG. 1 comprises a substrate 12 made of a piezoelectric acousto-optic material such as $LiNbO_3$. A single-mode optical waveguide 14 is defined in the substrate 12. An acoustic waveguide 16 for guiding the surface acoustic wave is also defined in the substrate 12. The optical waveguide 14 is contained inside of the acoustic waveguide 16. The optical waveguide 14 is formed by diffusing Titanium into the substrate surface in the region of the optical waveguide. The acoustic waveguide is also formed by diffusing Titanium into the surface-acoustic-wave barrier regions 21 and 22. The dimension of an optical waveguide is much smaller than that of an acoustical waveguide so that the existence of the Ti-diffused optical waveguide in the middle of the acoustic waveguide does not prevent the acoustic waveguide from being a single-mode acoustic waveguide. A surface acoustic wave is launched in the acoustic waveguide 16 by applying an AC voltage to the interdigitated comb electrodes 23,24. The surface acoustic wave propagates in the acoustic waveguide 16 for a distance L and is absorbed by the surface-acoustic-wave absorber 25. Backward propagating surface acoustic waves are absorbed by the absorber 25'.

Multiwavelength light, wherein all the wavelengths supposedly have the same polarization state, enters the optical waveguide at the input end 26. The optical waves in the optical waveguide 14 interact with the surface acoustic wave in the acoustic waveguide in the acousto-optic interaction region of length L. As indicated previously, the propagation constant of the surface acoustic wave is chosen so that one of the optical wavelengths emerges from the output end 27 of the optical waveguide 14 with its polarization state altered, while the polarization state of the other optical wavelengths is unchanged.

The amplitude of the acoustic waves is constant for the entire interaction length L. Thus, the acousto-optic interaction profile, which is the amplitude envelope of the surface acoustic z wave is rectangular. The interaction profile is constant as a function of the z coordinate inside the region of length L and zero outside the region of length L. The interaction profile q(z) is plotted as a function of the normalized z coordinate in FIG. 2. The frequency response of the corresponding acousto-optic filter is plotted as a function of the normalized frequency in FIG. 3. (The center frequency of the frequency response in the physical world is equal to the nominal frequency of the selected wavelength whose polarization state is to be changed. However, in FIG. 3, this center frequency is normalized to zero). As can be seen in FIG. 3, the frequency response of the filter 10 of FIG. 1 has a highly peaked passband and the side-lobes are large.

FIG. 4 shows an acousto-optic interaction profile for a filter whose interaction profile is a half-period sinusoid. By solving the well-known coupled-mode equations, the frequency response of an acousto-optic filter with this interaction profile can be determined, and is plotted in FIG. 5. In comparison to the frequency response of FIG. 3, the frequency response of FIG. 5 has substantially reduced sidebands, but the passband is still highly peaked.

A prior-art filter structure which achieves the interaction profile of FIG. 4, and thus the frequency response of FIG. 5, is illustrated in FIG. 6. The filter structure 40 comprises the substrate 42, which is made of a piezo-electric acousto-optic material such as LiNbO$_3$. An optical waveguide 44 is defined in the substrate 40. A pair of parallel acoustic waveguides 46, 48 are also defined in the substrate. The optical waveguide 44 is defined in the substrate by Titanium diffusion. The acoustic waveguides 46, 48 for guiding a surface acoustic wave are defined in the LiNbO$_3$ substrate by Titanium diffusion in the surface acoustic wave barrier regions 50, 52, 54. Note that the optical waveguide 44 is located inside the acoustic waveguide 46. A second optical waveguide 45 may be formed inside the acoustical waveguide 48, so that the two acoustic waveguides are symmetric and efficient directional coupling between the two acoustic waveguides is achieved.

In the filter 40, multiwavelength light, wherein all of the wavelengths supposedly have the same polarization state, enters the optical waveguide 44 at the input end 55. The multiwavelength light leaves the optical waveguide 44 all the output end 56 with the polarization state of a selected wavelength changed and the polarization state of the other wavelengths unchanged.

The polarization state of the selected optical wavelength is changed by the interaction of the selected optical wavelength with a surface acoustic wave. The surface acoustic wave is launched by the interdigitated comb electrodes 57, 58 in the acoustical waveguide 48 and is absorbed by the absorber 59. Backwards propagating surface acoustic waves are absorbed by the absorber 59'. The surface acoustic wave couples from the acoustic waveguide 48 into the acoustic waveguide 46 as indicated by the dotted lines 60. The coupling is such that the surface acoustic wave in the acoustic waveguide 46 has an amplitude profile which is near zero at location 61, increases sinusoidally to a peak at location 62, and returns to zero at location 63 in accordance with the half-period sinusoid function. Thus, the acousto-optic interaction profile is as shown in FIG. 4 and the frequency response with a highly peaked passband is as shown in FIG. 5.

It is an object of the present invention to provide an acoustic-optic filter which overcomes the problems associated with the prior-art acousto-optic filters. Specifically, it is an object of the present invention to provide an acousto-optical filter whose frequency response has near-ideal bandpass filter characteristics, i.e., near-unity transmission inside the passband and near-zero transmission outside the passband.

SUMMARY OF THE INVENTION

In accordance with an illustrative embodiment of the invention, an acousto-optic tunable filter is provided with a unique acousto-optic interaction profile. This acousto-optic interaction profile results in a filter having near-ideal bandpass characteristics, i.e., near-unity transmission passband and near-zero transmission outside, in comparison to the highly peaked passbands of the prior-art filter structures. This frequency response has significant advantages for telecommunications applications. The wide flat passband means that there is an increased tolerance for off-tuned input wavelengths. The elimination of side-lobes increases the isolation between selected and unselected wavelengths. As a result, there is decreased crosstalk between channels.

The acousto-optic interaction profile which results in this frequency response has a damped oscillation whose polarity alternates, i.e., the acousto-optic interaction profile has a damped oscillating shape. An example of such a profile is a fourth-order Butterworth profile.

An illustrative physical structure which is used to implement the filter comprises first and second coupled acoustic waveguides formed on the surface of a substrate.. An optical waveguide is located within the second acoustic waveguide. The first and second acoustic waveguides taper toward each other at least over a portion of their length located near one end of the substrate and have a constant spacing over the remainder of their length. A damping structure is provided to damp surface acoustic waves propagating in the two directionally-coupled acoustic waveguides. Surface acoustic waves launched in the first acoustic waveguide are coupled into the second acoustic waveguide to achieve the desired interaction profile in the second acoustic waveguide which, as indicated, contains the optical waveguide. The desired interaction profile which has a damped oscillation shape is achieved because of the damping structure and the tapered structure of the acoustic waveguides.

BRIEF DESCRIPTION OF THE DRAWING

FIG. 11 illustrates a second filter structure which has the acousto-optic interaction profile of FIG. 7, in accordance with the invention.

DETAILED DESCRIPTION OF THE INVENTION

Figure 1:
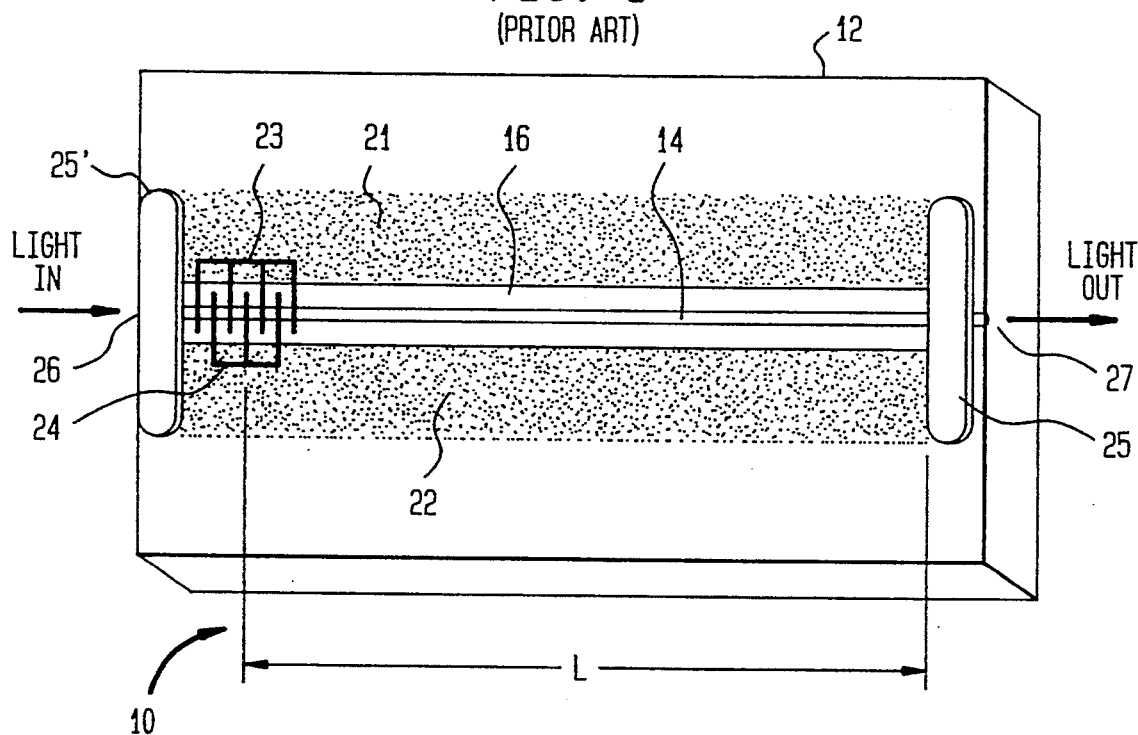
FIG. 1 schematically illustrates a prior art acousto-optic filter whose frequency response has a highly peaked passband and strong side-lobes.
Figure 2:
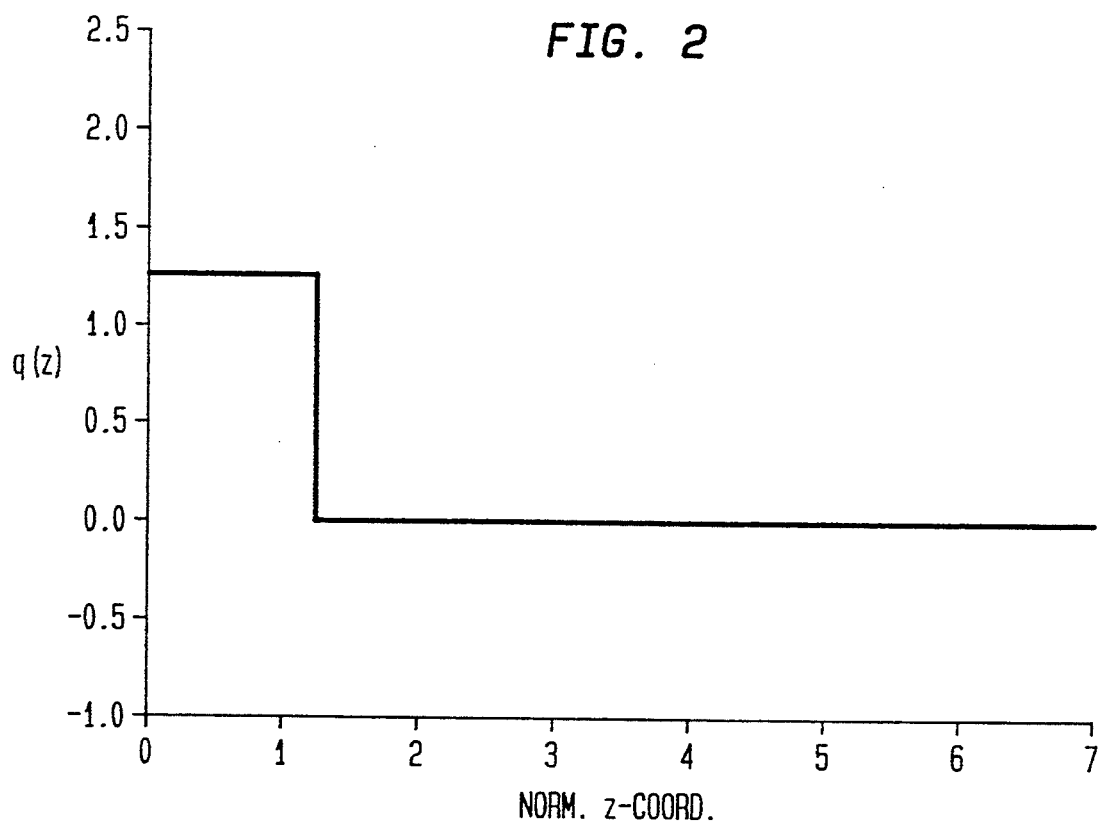
FIG. 2 illustrates an acousto-optic interaction profile of the filter of FIG. 1.
Figure 3:
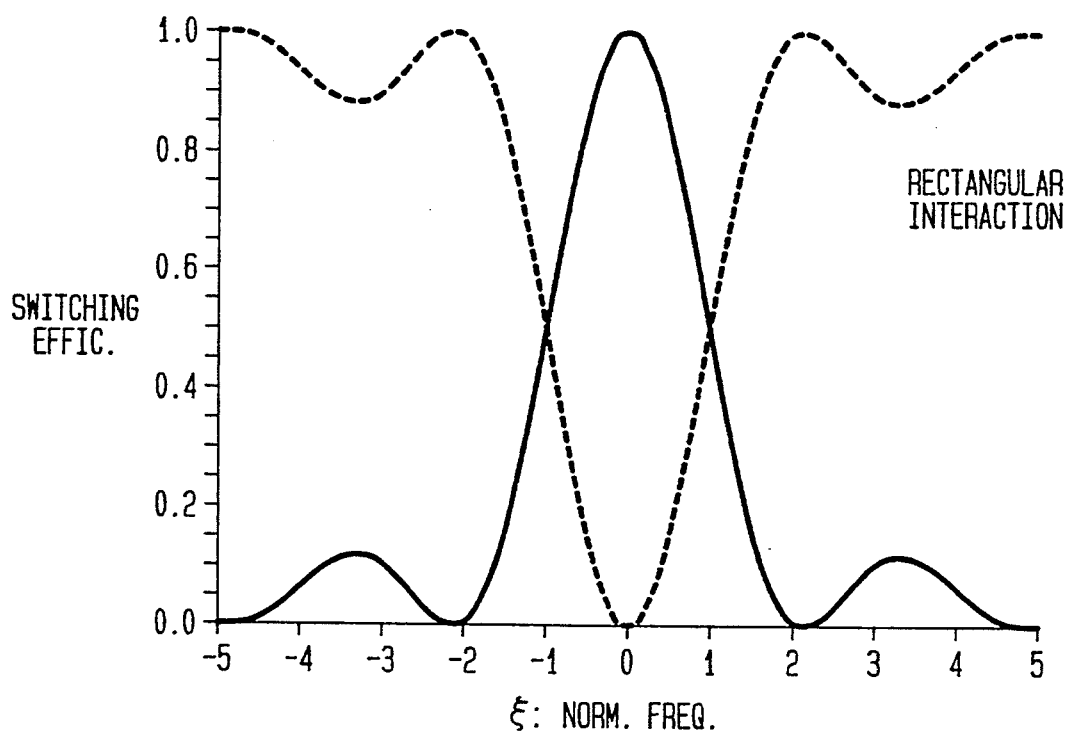
FIG. 3 illustrates the frequency response of the filter of FIG. 1.
Figure 4:
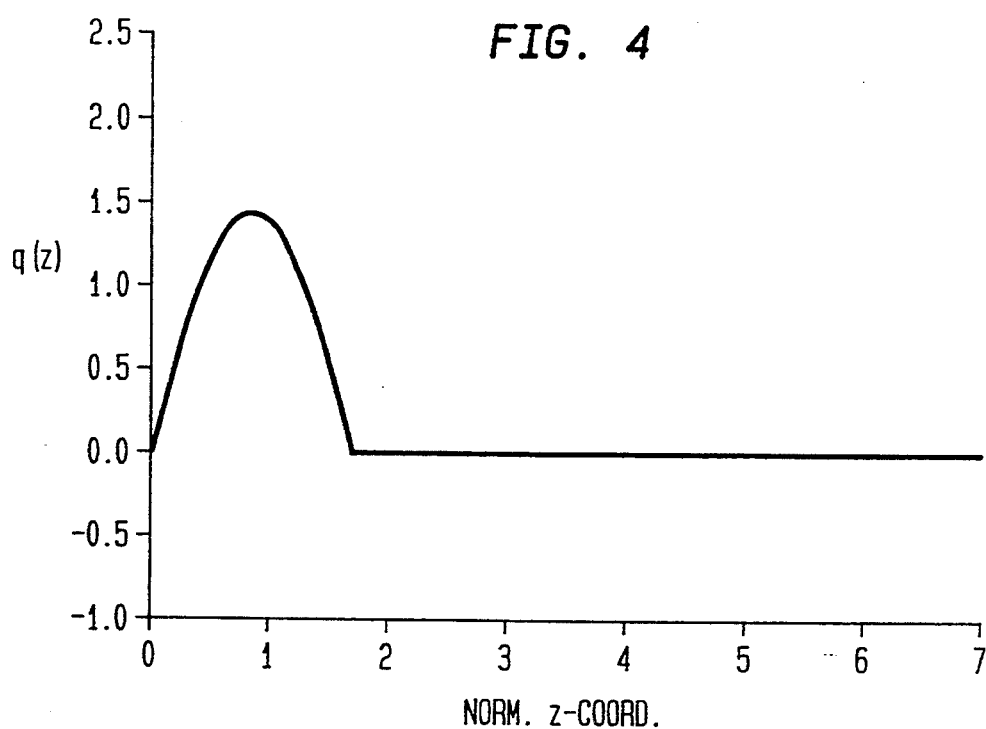
FIG. 4 illustrates an acousto-optic interaction profile which results in a filter whose frequency response has a narrow highly peaked passband, but in which the side-lobes are suppressed.
Figure 5:
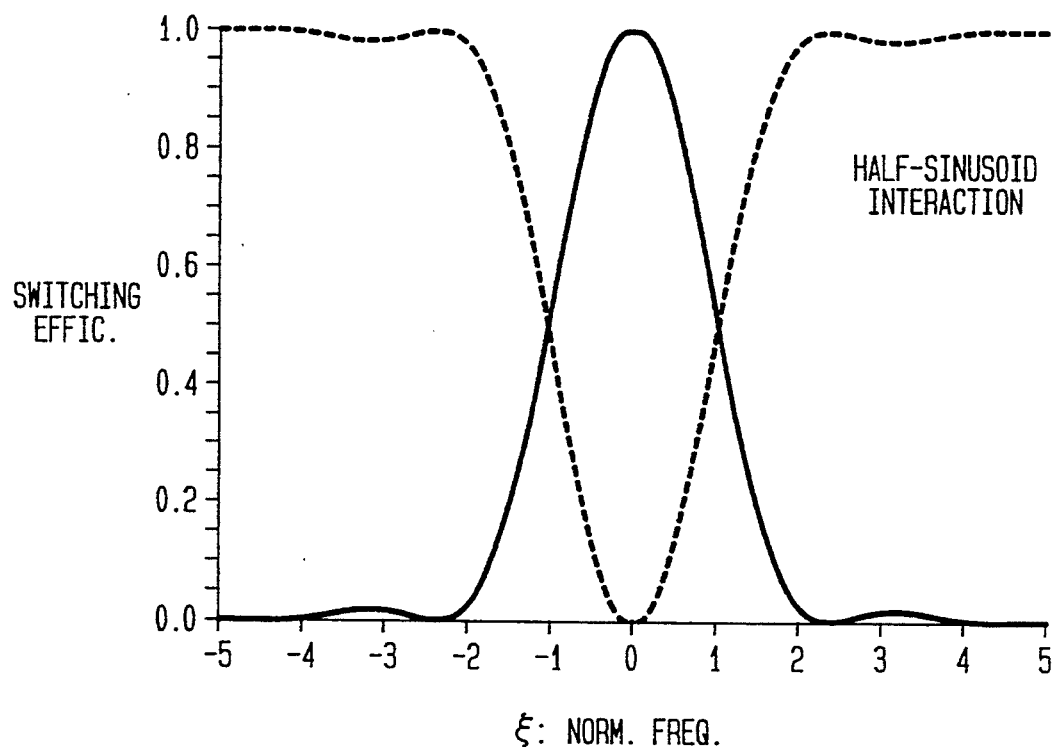
FIG. 5 illustrates the frequency response corresponding to the acousto-optic interaction profile of FIG. 4.
Figure 6:
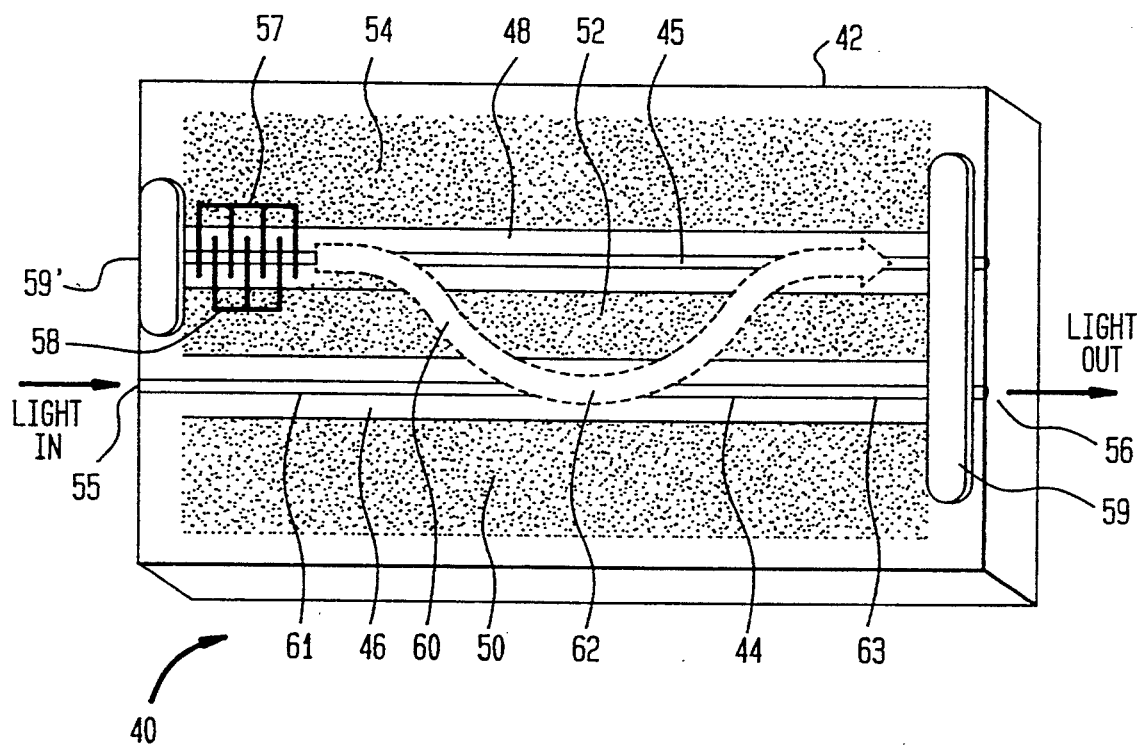
FIG. 6 illustrates a prior-art filter which has the acousto-optic interaction profile of FIG. 4 and thus the frequency response of FIG. 5.
Figure 7:
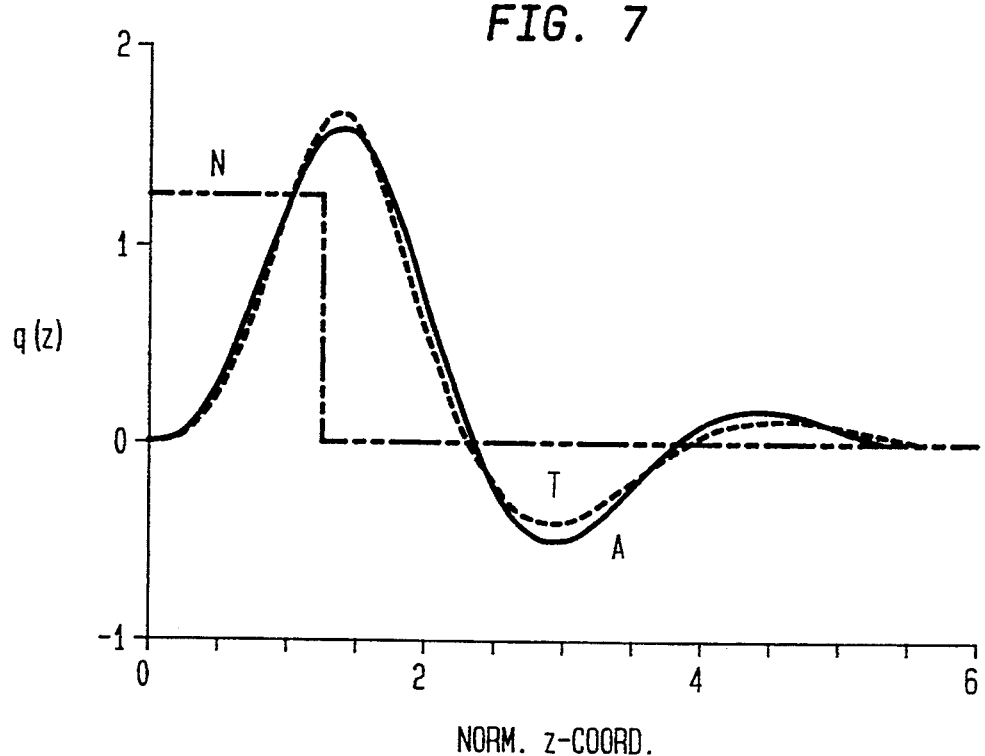
FIG. 7 illustrates three different: acousto-optic interaction profiles on a normalized length versus amplitude scale. Curve T represents the profile of the fourth-order Butterworth filter which is truncated at the third zero-crossing point. Curve A represents the profile that closely approximates Curve T in accordance with the invention. Curve N represents the profile of straight acousto-optic interaction on the same normalized length versus amplitude scale.
Figure 8:
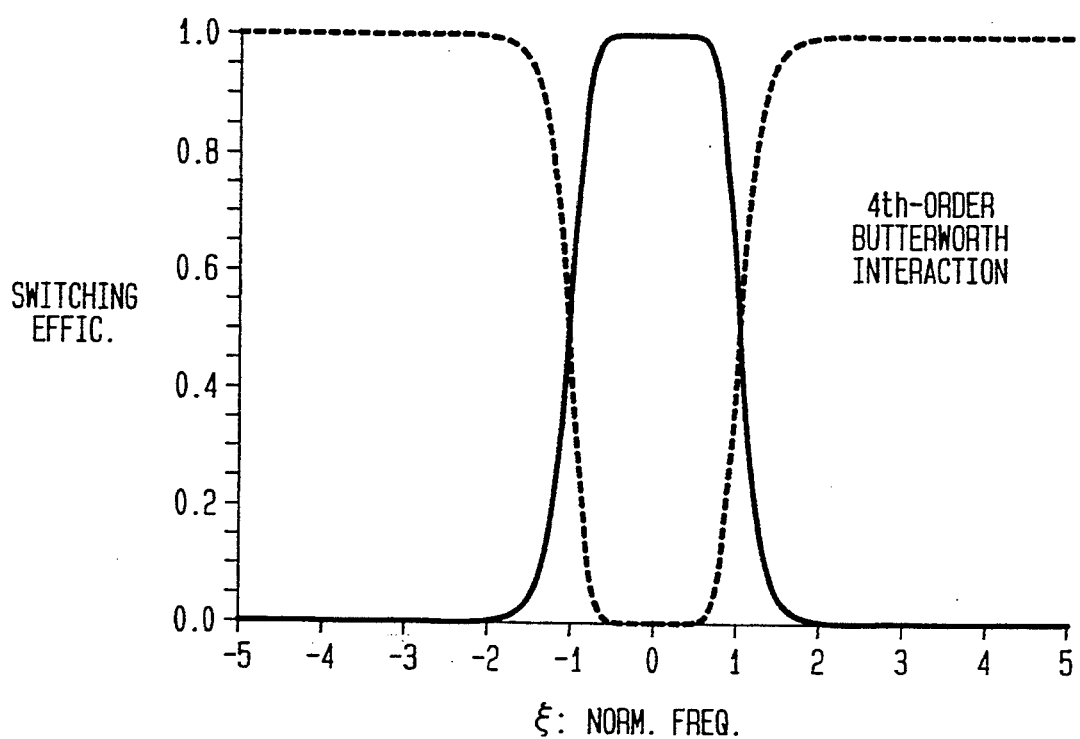
FIG. 8 illustrates the frequency response of an acousto-optic filter which has the acousto-optic interaction profile of curve T in FIG. 7.

Turning to FIG. 7, curve T (dashed curve) is a plot of an acousto-optic interaction profile which is the fourth-order Butterworth profile. FIG. 8 shows the frequency response of an acousto-optical filter with the acousto-optic interaction profile of curve T of FIG. 7. As can be seen in FIG. 8, this frequency response has a broad flat passband in which the transmission intensity is near unity and which has virtually zero side-lobes. As indicated above, this frequency response is very desirable for telecommunications applications because it increases the tolerance to off-tuned input optical wavelengths and increases the selectivity against unselected wavelengths.

The curve A (solid line) in FIG. 7 is an acousto-optic interaction profile, which closely approximates a truncated fourth-order Butterworth profile and which is realizable in a physical structure (to be described in detail below). Specifically, the interaction profile of curve A is an exponentially damped sinusoid with the gradual onset in the beginning. The physically realizable filter with the acousto-optic interaction profile of curve A of FIG. 7, has a frequency response which is very close to the frequency response of FIG. 8.

It should be noted that other interaction profiles which oscillate in phase polarity and are damped also result in filters which have good frequency response characteristics. Examples of such functions include $3^{rd}$ and higher order Butterworth functions and physically realizable approximations thereof such as exponentially damped sinusoidal functions.

Figure 9:
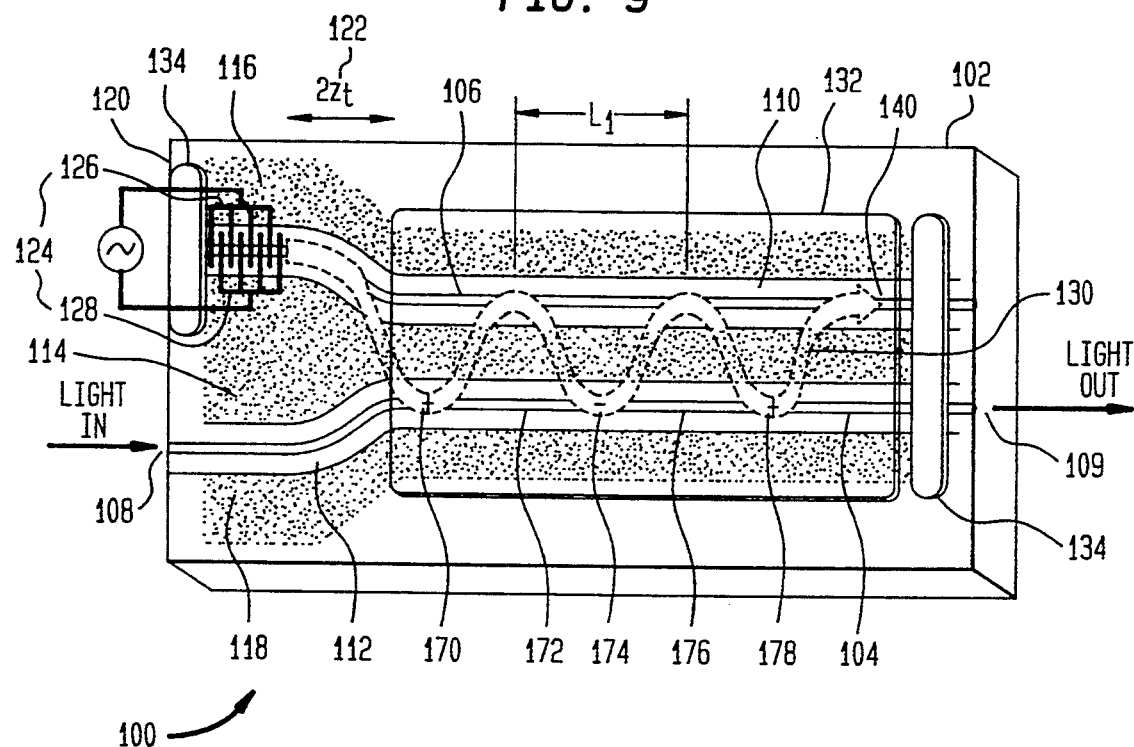
FIG. 9 illustrates a first filter structure which has the acousto-optic interaction profile of FIG. 7, in accordance with the invention.

FIG. 9 schematically illustrates an acousto-optic filter in accordance with the present invention. As is shown below, the acousto-optic filter 100 of FIG. 9 has an acousto-optic interaction profile which alternates in polarity and is damped, and closely approximates the fourth-order Butterworth profile. Thus the filter structure of FIG. 9 has highly desirable frequency response characteristics.

The acousto-optic filter 100 of FIG. 9 comprises a LiNbO$_3$ substrate 102.

First and second coupled acoustic waveguides 110 and 112 are also defined in the substrate 102. The dummy optical waveguide 106 is located inside the acoustic waveguide 110. The optical waveguide 104 is located inside the acoustic waveguide 112. The acoustic waveguides 110 and 112 illustratively have a width of 100 μm. The acoustic waveguides are formed by Titanium diffusion into the surface acoustic wave barrier regions 114, 116, 118. The barrier regions are defined by depositing Titanium at the thickness of 160 nm followed by diffusing Ti into the substrate surface at 1050° C. in two separate steps of 22.5 h and 8.5 h, the second of which is the step for the optical waveguide formation which will be described later. Details of waveguide formation can be found in D. A. Smith and J. J. Johnson, "Surface-acoustic-wave directional coupler for apodization of integrated acousto-optic filters," IEEE Transactions on Ultrasonics, Ferroelectrics, and Frequency Control, vol. 40, pp. 22–25, 1993. Near the end 120 of the substrate 102, the acoustic waveguides 110, 112 taper towards each other. The tapering takes place over tapering region 122 of length $2z_t$ along the z axis. The length $2z_t$ is about 8/5 of the length $L_1$ (about 15 mm). The tapered portion of the parallel coupled waveguide structure is provided to achieve the gradual onset of the desired interaction profile. At the beginning of the tapering region 122, the acoustic waveguides 110, 112 are separated by a gap distance of 150 μm. At the end of the tapering region 122, the acoustic waveguides are separated from each other by a gap distance of 20 μm. In the illustrative embodiment of the inventive filter shown in FIG. 9, the acoustic waveguides taper toward each only over a portion of their total length in the tapering region 122 and are parallel outside the tapering region. In other embodiments of the invention, the acoustic waveguides may taper toward each other over their entire length in order to obtain a more accurate match between the curve T of FIG.7 and the realized acousto-optic interaction profile from a physical embodiment.

A pair of optical waveguides 104 and 106 are defined in the substrate. The optical waveguides 104 and 106 are formed by a Titanium indiffusion process: Titanium is deposited on the LiNbO$_3$ substrate to become a thin-film stripe of thickness 80 nm and of width 8 μm. It is then heated at 1050° C. for 8.5 hours so that Titanium atoms are diffused into the surface of the LiNbO$_3$ substrate. A surface-acoustic-wave transducer is made by depositing a pair of interdigitated comb electrodes 126, 128 at one end of the first acoustic waveguide 110. The electrodes are excited by an AC voltage. The surface acoustic wave transducer launches surface acoustic waves into the acoustic waveguide 110 at a frequency around 175 MHz, which depends on the particular wavelength of light whose polarization state is to be changed. The surface acoustic wave energy couples back and forth between the waveguides 110 and 112 as indicated by the curved lines 130.

Multiple wavelength light, supposedly with a single polarization state, enters the optical waveguide 104 at an input end 108. The multiwavelength light in the waveguide 104 interacts with a surface acoustic wave with an acousto-optic interaction profile that alternates in phase polarity and which is damped. The multiwavelength light leaves the optical waveguide 104 at an output end 109 with the polarization state of a selected one of the wavelengths changed, but with the remainder of the wavelengths having an unchanged polarization state. The optical waveguide 106 is a dummy optical waveguide. However, its existence makes the whole acoustic waveguide structure symmetric so that a complete transfer of acoustic energy between the two waveguides can happen.

A damping structure is incorporated into the filter 100. The purpose of the damping structure is to damp the surface acoustic waves propagating in acoustic waveguides 110 and 112. The damping is used because the prescribed acousto-optic interaction profile of curve T in FIG. 7 is approximately a damped sinusoid except the onset region which is to be realized by the tapered geometry described previously. In the filter 100 of FIG. 9, the damping structure comprises a thin layer 132 of a viscous polymer material such as PMMA (polymethyl metacrylate) which overlays the acoustic waveguides 110, 112. The polymer material may be applied broadly or only over the acoustic waveguides. Preferably the optical waveguide structure should not be a leaky structure in terms of the refractive-index profile. Almost fall polymer material has the refractive index lower than that of $LiNbO_3$. Thus, the optical waveguide structure does not become leaky. If that is not the case, or if the polymer material is optically lossy, the polymer overlay pattern should be designed to be absent in the vicinity of the optical waveguides.

Absorbers 134, 134', which illustratively are formed from rubber cement, are located on the surface of the substrate 102 near the ends 140, 120. The absorber 134 absorbs surface acoustic waves propagating in the waveguides 110, 112, preferably at the place where the acousto-optic interaction profile along the optical waveguide 104 crosses zero. The absorber 134' absorbs backward propagating surface acoustic waves generated by the transducer 124.

Because of the tapering of the acoustic waveguides 110, 112 towards each other in the tapering region 122 and the damping of the surface acoustic waves in the acoustic waveguides 110, 112, the envelope function which multiplies onto an otherwise monotonically sinusoidal acoustic wave on the surface along the optical waveguide 104, i.e., the acousto-optic interaction profile, has a damped-oscillation shape with a gradual onset. Specifically, the interaction profile has a positive maximum at location 170, a zero-crossing at location 172, a negative minimum at location 174, a zero-crossing at location 176, and a second positive maximum at location 178 which is smaller than the first positive maximum at location 170 because of the damping introduced by the damper 132.

The interaction profile $q(z)$ of the filter 100 of the FIG. 9 is an exponentially damped sinusoid.

$$q(z) = Q\sin[K(z)]\, e^{-\frac{\alpha z}{L}}$$

where $$K(z) = \frac{N\pi\left[z - \left(\frac{\sqrt{\pi}}{2}\right)z_t \operatorname{erf}\left(\frac{z}{z_t}\right)\right]}{\left[L - \left(\frac{\sqrt{\pi}}{2}\right)z_t \operatorname{erf}\left(\frac{L}{z_t}\right)\right]}$$

z is the direction of propagation along the waveguide, L is the total length of the acousto-optic interaction region, N is the number of polarity alternations, $\alpha$ is the normalized loss constant of the surface acoustic waves, $2z_t$ is the length of the tapering region and Q is an overall amplitude factor.

Some illustrative parameter values are:
L=7.5 cm
Q=3.5 cm$^{-1}$
$z_t$=1.4 cm
N=3
$\alpha$=4.0

The damped sinusoid $q(z)$ given by the equation above and plotted as curve A in FIG. 7 closely approximates the fourth-order Butterworth acousto-optic interaction profile of curve T of FIG. 7. Thus, the filter 100 of FIG. 9 has very good frequency response characteristics. The set of numbers given above results in a passband width approximately on the order of 1.1 nm or 150 GHz.

It should be noted that profiles other than the fourth-order Butterworth profile may be synthesized by tayloring the gap between the two waveguides to control the coupling of the surface acoustic waves.

Figure 10A:
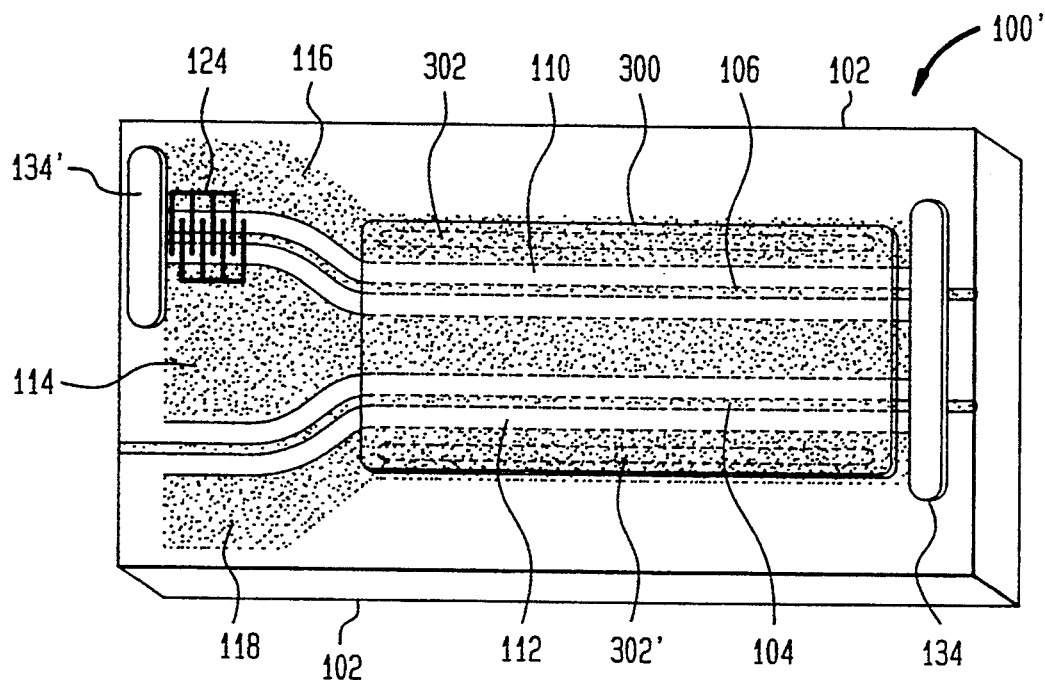
FIG. 10A and FIG. 10B illustrate a top view and a side view of another acousto-optic filter which has the acousto-optic interaction profile of FIG. 7, in accordance with the invention.
Figure 10B:
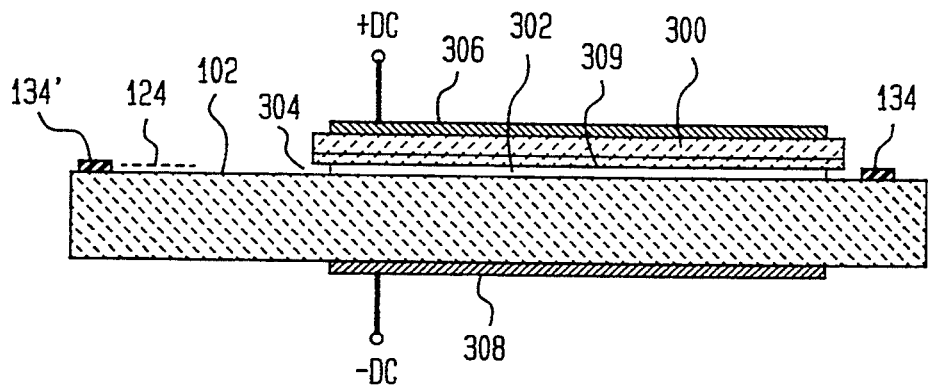

Instead of using a layer of polymer material to damp the surface acoustic waves in the acoustic waveguides, an impurity-doped semiconductor bar may be used for this purpose. FIG. 10A shows the top view and FIG. 10B shows the side view of an acousto-optic filter 100' wherein a doped semiconductor bar may be used to damp the surface acoustic waves. Thus, in FIGS. 10A and 10B the doped silicon bar 300 replaces the polymer film 132. The bar 300 has a thickness greater than about 1 μm and is doped with either n-type or p-type impurities so that its conductivity is about $1\Omega^{-1}\text{-m}^{-1}$. The spacers 302, 302' support the bar 300 with an air-gap whose distance is in the range of 0.1 μm to 1 μm above the surface of the $LiNbO_3$ substrate 102. The amount of damping provided by the semiconductor bar 300 can be controlled by applying a bias voltage across the air gap 304 using the electrode 306 mounted on the top surface of the bar 300 and the electrode 308 mounted on the bottom of the substrate 102. The bottom surface 309 of the silicon bar 300 is oxidized to prevent the buildup of semiconductor surface states.

This semiconductor configuration was used in the surface-acoustic convolver (W. C. Wang, "A novel ultrasonic oscillator and convolution integrator," presented at the Joint Services Technical Advisory Committee Meeting, Polytechnic Institute of Brooklyn, N.Y., 1966) which is a variation of the classic surface-acoustic delay-line filter. In such a case, attenuation is not a desirable feature.

Figure 10C:
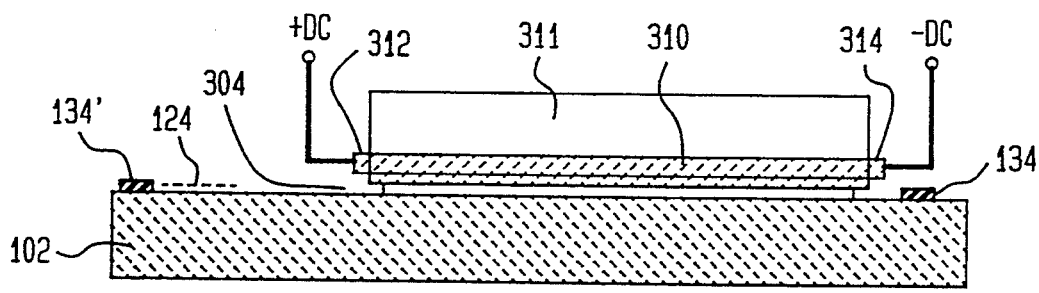
FIG. 10C illustrates another side-view of an acousto-optic filter, whose top-view is similar to FIG. 10A, in accordance with the invention.

A modification to the above structure is possible by utilizing the configuration of a surface-acoustic amplifier (P. K. Tien, U.S. Pat. No. 3,158,819, Nov. 24, 1964) which is again a variation of the surface-acoustic wave delay-line filter. Electrode patches 312, 314 are deposited at the two ends of the semiconductor film 300 as shown in the side-view illustration of FIG. 10C. In FIG. 10C, the semiconductor film 310 is formed by growing a thin layer of silicon approximately 1 μm thick on a sapphire substrate 311. The whole structure can be pressured, for instance, by using silicone rubber, in order to keep everything in place with good air gap uniformity. Electrical current is injected and drives the charge carriers along the z-axis. Then these traveling (or, in other words, drifting) electrical charge carriers interact with the piezo-electric field inside the semiconductor film 300 induced by the surface-acoustic wave on the surface of $LiNbO_3$ substrate. By adjusting the current, we can easily adjust the attenuation level to a desired value. For the above two variations which use a semiconductor, (FIG. 10B and FIG. 10C) accurate control of the attenuation is in principle possible by the precise control of the air-gap distance and the impurity-doping level. However, the capability of adjusting the level of attenuation after the fabrication is of tremendous advantage.

A good review on the above-mentioned, two classic surface-acoustic devices—the surface acoustic convolver and the surface-acoustic amplifier—is found in G. S. Kino, "Acoustoelectric interactions in acoustic-surface-wave devices," Proceedings of the IEEE, vol. 64, pp. 724–728, 1976.

It should also be noted that other techniques besides Titanium diffusion into the surface acoustic wave barrier regions 114, 116, 118 may be used to form the acoustic waveguides 110, 112. For example, in FIG. 11, the filter 100' is identical to the filter 100 of FIG. 9 except that the acoustic waveguides 110', 112' are formed by the semiconductor thin-film (e.g., InSb) or metallic thin-film stripes 202, 204 and 206, 208. Use of a semiconductor strip directly deposited on the surface of $LiNbO_3$ for the acoustic amplifier configuration was reported in L. A. Coldren and G. S. Kino, "CW monolithic acoustic surface wave amplifier incorporated in a $\Delta v/v$ waveguide," Applied Physics Letters, vol. 23, pp. 117–118 (1973). The optical waveguides 104, 106 are formed by Titanium diffusion between the stripes 202, 204 and 206, 208.

In the case where the acoustic waveguides are formed by the semiconductor or metal stripes 202, 204 and 206, 208, the damping of the surface acoustic waves is provided by the finite conductivity of the stripes. Thus, in those cases, when the semiconductor or metal stripes are used to define the acoustic waveguides, a separate damping structure is not needed, rather, the semiconductor or metal stripes themselves serve both as the acoustic waveguide and the acoustic damping structure. Electrical current flowing along the long stripes may be provided in order to tune the damping constant.

While the invention has been described in connection with filters based on acousto-optic interactions, the invention is also applicable to other interactions as well. Thus, instead of changing the polarization state of one wavelength in multiwavelength optical radiation, the filter may be used to change the polarization state of one wavelength in multiwavelength electromagnetic radiation of a different wavelength range such as millimeter wavelength radiation. Similarly, instead of using acoustic waves to change the polarization state, other waves such as ferro-magnetic waves may be used. Any wave which can interact with the multiwavelength electromagnetic radiation and which has a propagation constant equal to the change in propagation constant between the initial and final polarization states of the selected electromagnetic wavelength may be used.

Finally, the above described embodiments of the invention are intended to be illustrative only. Numerous alternative embodiments may be devised by those skilled in the art without departing from the spirit and scope of the following claims.

I claim:

1. A method for filtering multiwavelength electromagnetic radiation having a single polarization state to selectively change the polarization state of at least one of the wavelengths comprising the step of causing the electromagnetic radiation to interact with other waves having an interaction profile which is oscillating in phase polarity and which is damped and which have a propagation constant equal to a change in propagation constant of the selected wavelength.

2. The method of claim 1 wherein said multiwavelength electromagnetic radiation is optical radiation.

3. The method of claim 2 wherein said other waves are acoustic waves.

4. The method of claim 3 wherein the interaction profile is an acousto-optic interaction profile.

5. The method of claim 1 wherein the other waves are ferromagnetic waves.

6. The method of claim 1 wherein said interaction profile substantially approximates a fourth-order Butterworth profile.

7. A filter for filtering multiwavelength electromagnetic radiation having a single polarization state to selectively change the polarization state of at least one of the wavelengths comprising:
   an electromagnetic waveguide which receives at an input end said multiwavelength electromagnetic radiation and which outputs at an output end said multiwavelength electromagnetic radiation with at least one of the wavelengths having a changed polarization state, and
   a structure for generating another wave which interacts with said multiwavelength electromagnetic radiation in said electromagnetic waveguide with an interaction profile that oscillates in polarity and that is damped and with a propagation constant equal to the change in propagation constant of the selected wavelength.

8. The filter of claim 7 wherein said multiwavelength electromagnetic radiation is multiwavelength optical radiation and said electromagnetic waveguide is an optical waveguide.

9. The filter of claim 8 wherein said other wave is an acoustic wave.

10. The filter of claim 9 wherein said interaction profile is an acousto-optic interaction profile.

11. The filter of claim 10 wherein said structure for generating a wave comprises:
   a first acoustic waveguide in which acoustic waves are propagated
   a second acoustic waveguide coupled to said first acoustic waveguide and containing said optical waveguide, and a damping structure for damping acoustic waves propagating in said first and second acoustic waveguides,
   said acoustic waves propagated in said first acoustic waveguide being coupled into said second acoustic waveguide so that said acoustic waves in said second acoustic waveguide have said interaction profile.

12. The filter of claim 11 wherein said first and second acoustic waveguides taper toward each other over at least a portion of their length.

13. The filter of claim 12 wherein said optical waveguide and said first and second acoustic waveguides are formed on a surface of a substrate.

14. The filter of claim 7 wherein said other wave is a ferromagnetic wave.

15. A filter for filtering multiwavelength electromagnetic radiation having a single polarization state to selectively change the polarization state of at least one of the wavelengths comprising:
   an electromagnetic waveguide which receives at an input end said multiwavelength electromagnetic radiation and which outputs at an output end said multiwavelength electromagnetic radiation with at least one of the wavelengths having a changed polarization state, a structure for generating another wave which interacts with said multiwavelength electromagnetic radiation in said electromagnetic waveguide with an interaction profile that oscillates in phase polarity and that is damped and that has a propagation constant equal to a change in propagation constant of the selected wavelength, wherein said structure for generating a wave comprises:

a first waveguide in which said other waves propagate, a second waveguide coupled to the first waveguide in which other waves propagate, said second waveguide containing said electromagnetic waveguide, and a damping structure for damping other waves propagating in said first and second waveguides, said other waves propagating in said first waveguide being coupled into said second waveguide so that said other waves in said second waveguide have said interaction profile.

16. An acousto-optic filter for receiving multiple wavelength optical radiation with a single polarization state and for changing the polarization state of one of the optical wavelengths comprising:

a substrate, first and second coupled acoustic waveguides formed on said substrate, said acoustic waveguides tapering toward each other at least over a portion of their length located near one end of the substrate, a transducer for launching surface acoustic way in said first acoustic waveguide, said surface acoustic waves coupling into said second acoustic waveguide, a structure for damping said surface acoustic waves in said acoustic waveguides, and an optical waveguide formed on said substrate within said second acoustic waveguide, said optical waveguide receiving said multiwavelength optical radiation at an input near said one end of said substrate and outputting said multiwavelength radiation with the polarization state of one wavelength changed at an output, wherein said surface acoustic waves coupled into said second acoustic waveguide have an acousto-optic interaction profile which oscillates in phase polarity and is damped.

17. The filter of claim 16 wherein said damping structure comprises a layer of damping material formed on said substrate.

18. The filter of claim 16 wherein said damping structure comprises a doped bar of semiconductor material located above said substrate.

19. The filter of claim 16 wherein said transducer comprises a pair of interdigitated electrodes formed on said substrate at said one end of said substrate and coupled to said first acoustic waveguide.

20. The filter of claim 16 further comprising an absorber located at a second end of said substrate oppositely disposed from said first end of said substrate for absorbing surface acoustic waves propagating in said first and second acoustic waveguides.

21. The filter of claim 16 wherein said acoustic waveguides are formed by metallic stripes on the surface of said substrate, said metallic stripes also forming said damping structure.

22. The filter of claim 16 wherein said acoustic waveguides are formed by semiconductor stripes on the surface of said substrate, said semiconductor stripes also forming said damping structure.

* * * * *